(12) United States Patent
Ohmura et al.

(10) Patent No.: US 7,564,343 B2
(45) Date of Patent: Jul. 21, 2009

(54) OBSTACLE DETECTING CONTROL DEVICE OF VEHICLE

(75) Inventors: Hiroshi Ohmura, Hiroshima (JP); Haruki Okazaki, Hiroshima (JP); Yasunori Yamamoto, Hiroshima (JP); Masanobu Fukushima, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 344 days.

(21) Appl. No.: 11/546,249

(22) Filed: Oct. 12, 2006

(65) Prior Publication Data

US 2007/0109110 A1     May 17, 2007

(30) Foreign Application Priority Data

Nov. 15, 2005   (JP)  ............................. 2005-330337

(51) Int. Cl.
   *B60Q 1/00*   (2006.01)
(52) U.S. Cl. ...................... 340/436; 701/301
(58) Field of Classification Search .................. 340/436, 340/435, 903; 180/232, 268; 701/96, 301
   See application file for complete search history.

(56) References Cited

U.S. PATENT DOCUMENTS

| | | | | |
|---|---|---|---|---|
| 5,745,070 A | * | 4/1998 | Yamada | ...................... 340/436 |
| 6,157,892 A | * | 12/2000 | Hada et al. | ................... 701/301 |
| 6,256,565 B1 | | 7/2001 | Yanaga et al. | |
| 6,292,753 B1 | * | 9/2001 | Sugimoto et al. | ........... 701/301 |
| 6,675,096 B2 | * | 1/2004 | Matsuura | .................... 701/301 |
| 7,266,453 B2 | * | 9/2007 | Sawamoto et al. | .......... 340/436 |
| 2004/0019426 A1 | | 1/2004 | Knoop et al. | |

FOREIGN PATENT DOCUMENTS

| | | |
|---|---|---|
| EP | 0976627 | 2/2000 |
| JP | 2000-036098 | 2/2000 |

OTHER PUBLICATIONS

European Search Report Application No. EP 06 02 1976 dated Apr. 11, 2007.

* cited by examiner

*Primary Examiner*—John A Tweel, Jr.
(74) *Attorney, Agent, or Firm*—Studebaker & Brackett PC; Donald R. Studebaker

(57) ABSTRACT

A millimeter-wave radar (obstacle detecting device) detects an obstacle in front of a traveling vehicle. A driving-state detecting device detects a specified driving state of the vehicle. An operation-timing changing device changes an operation timing of operational devices according to detection results of the driving-state detecting device. A control unit (operation control device) operates the operational devices (warning device, brake device, seatbelt pre-tensioner) at the above operation timing. Thus, the safe and smooth vehicle driving can be attained without an improper detection of the obstacle.

11 Claims, 3 Drawing Sheets

OBSTACLE DETECTING CONTROL DEVICE OF VEHICLE

BACKGROUND OF THE INVENTION

The present invention relates to an obstacle detecting control device of a vehicle that controls an operational device of the vehicle according to an obstacle state detected by an obstacle detecting device.

Conventionally, an obstacle detecting control device of a vehicle, which includes an obstacle detecting device to detect an obstacle in front of the vehicle and an operation control device to control an operational device of the vehicle according to an obstacle state detected by the obstacle detecting device, is known.

For example, an inter-vehicle distance alarming device disclosed in Japanese Patent Laid-Open Publication No. 2000-36098, which makes a driver easily recognize the possibility or the increase of the possibility of being in contact with an obstacle different from a vehicle in front, is known.

However, the obstacle detecting control device of a vehicle equipped with the above inter-vehicle distance alarming device may have the following problem. Namely, in a case where a driver operates a steering wheel to make a vehicle turn at a curved corner or to make a vehicle traveling-lane change, the traveling vehicle would possibly avoid the contact with the obstacle in front. In this situation, however, the above conventional inter-vehicle distance alarming device may give the alarm in a normal manner despite a reduced risk of the contact with the obstacle. Namely, as long as it is detected that the distance between the vehicle and the obstacle is in a predetermined alarming distance, the device may give always the alarm. This means that the above alarming would be oversensitive and thereby a smooth vehicle driving would be deteriorated. In particular, when the vehicle travels on a narrow and winding road (a so-called crank road), an unnecessary alarming might happen regardless of a normal steering operation of the vehicle.

SUMMARY OF THE INVENTION

The present invention has been devised in view of the above-described problem, and an object of the present invention is to provide an obstacle detecting control device of a vehicle that can provide a safe and smooth vehicle driving.

According to the present invention, there is provided an obstacle detecting control device of a vehicle, which includes an obstacle detecting device to detect an obstacle in front of the vehicle and an operation control device to control an operational device of the vehicle according to an obstacle state detected by the obstacle detecting device, the obstacle detecting control device comprising a driving-state detecting device to detect a specified driving state of the vehicle, and an operation-timing changing device to change an operation timing of the operational device that is controlled by the operation control device according to detection results of the driving-state detecting device.

Thereby, when the specified driving state of the vehicle is detected by the driving-state detecting device, the operation timing of the operational device is changed to an appropriate timing for that specified driving state of the vehicle. Accordingly, the operational device can be controlled properly, and thus the safe and smooth vehicle driving can be attained.

According to an embodiment of the present invention, the operational device is configured to be controlled at least at a first operation timing and a second operation timing, the second operation timing being a timing that is delayed by a specified time from the first operation timing, and the operation-timing changing device is configured to change the operation timing of the operational device from the first operation timing to the second operation timing when the specified driving state of the vehicle is detected by the driving-state detecting device.

Thereby, the operation timing of the operational device can be properly delayed at a situation where the risk of contact of the vehicle with the obstacle is reduced, and thus the safe and smooth vehicle driving can be attained.

According to another embodiment of the present invention, the operation-timing changing device is configured to change the operation timing of the operational device by changing an obstacle-detecting area of the obstacle detecting device.

Thereby, when the specified driving state of the vehicle is detected by the driving-state detecting device, the operation timing of the operational device is changed, for example, by changing the obstacle-detecting area of the obstacle detecting device from a relatively wide area to a relatively narrow area. Thus, the operation timing of the operational device can be properly delayed at the situation where the risk of contact of the vehicle with the obstacle is reduced.

According to another embodiment of the present invention, the operational device of the vehicle is a warning device to warn a passenger of the vehicle of a dangerous state.

Thereby, at the situation where the risk of contact of the vehicle with the obstacle is reduced, the oversensitive alarming can be prevented.

According to another embodiment of the present invention, the operational device of the vehicle is a brake device to apply a braking force to the vehicle.

Thereby, likewise, at the situation where the risk of contact of the vehicle with the obstacle is reduced, an improperly excessive (too often) braking operation can be prevented.

According to another embodiment of the present invention, the operational device of the vehicle is a seatbelt pre-tensioner to pull in a seatbelt.

Thereby, likewise, at the situation where the risk of contact of the vehicle with the obstacle is reduced, an improperly excessive (too often) seatbelt pulling in can be prevented. Thus, it can be prevented that the passenger feels uncomfortable.

According to another embodiment of the present invention, the specified driving state of the vehicle that is detected by the driving-state detecting device is a turning state of the vehicle.

Thereby, when the turning state of the vehicle, such as a curved road or a lane changing, is detected by the driving-state detecting device, the operation timing of the operational device is properly changed. Thus, at the turning state of the vehicle where the risk of contact of the vehicle with the obstacle is reduced, the improperly excessive (too often) operation of the operational device can be prevented.

According to another embodiment of the present invention, the driving-state detecting device is configured to detect a steering angle of a steering wheel of the vehicle, and the turning state of the vehicle is detected by the driving-state detecting device when an absolute value of the steering angle of the steering wheel of the vehicle exceeds a specified steering angle.

Thereby, when it is detected by the driving-state detecting device that the absolute value of the steering angle of the steering wheel exceeds the specified steering angle, the operation timing of the operational device is properly changed. Thus, at the turning state of the vehicle where the risk of contact of the vehicle with the obstacle is reduced, the improperly excessive (too often) operation of the operational device can be prevented. Herein, a driver's steering operation can be detected promptly by detecting the steering angle directly.

According to another embodiment of the present invention, the driving-state detecting device is configured to detect a steering angle speed of a steering wheel of the vehicle, and the turning state of the vehicle is detected by the driving-state detecting device when an absolute value of the steering angle speed of the steering wheel of the vehicle exceeds a specified steering angle speed.

Thereby, when it is detected by the driving-state detecting device that the absolute value of the steering angle speed of the steering wheel of the vehicle exceeds the specified steering angle speed, the operation timing of the operational device is properly changed. Thus, at the turning state of the vehicle where the risk of contact of the vehicle with the obstacle is reduced, the improperly excessive (too often) operation of the operational device can be prevented. Herein, a driver's initial steering operation can be detected promptly by detecting the steering angle speed. Thereby, the improperly excessive operation of the operational device can be prevented at an early stage.

According to another embodiment of the present invention, the driving-state detecting device is configured to detect a lateral acceleration that is applied to the vehicle in a substantially lateral direction relative to a vehicle traveling direction, and the turning state of the vehicle is detected by the driving-state detecting device when an absolute value of the lateral acceleration applied to the vehicle exceeds a specified lateral acceleration.

Thereby, when it is detected by the driving-state detecting device that the absolute value of the lateral acceleration (so-called lateral G) exceeds the specified lateral acceleration, the operation timing of the operational device is properly changed. Thus, at the turning state of the vehicle where the risk of contact of the vehicle with the obstacle is reduced, the improperly excessive (too often) operation of the operational device can be prevented. Herein, the operation timing of the operational device can be properly changed because of detecting the lateral acceleration even if the vehicle makes a turn on a curved road having a relatively large turning radius at a relatively high speed.

According to another embodiment of the present invention, the driving-state detecting device is configured to detect an integrated value of a change of a steering angle of a steering wheel of the vehicle with a time, and the turning state of the vehicle is detected by the driving-state detecting device when an absolute value of the integrated value of the change of the steering angle of the steering wheel of the vehicle with the time exceeds a specified integrated value.

Thereby, when it is detected that the vehicle travels on a winding road by detecting the absolute value of the integrated value of the change of the steering angle of the steering wheel with the time exceeding the specified integrated value, the operation timing of the operational device is properly changed. Thus, at the turning state of the vehicle where the risk of contact of the vehicle with the obstacle is reduced, the improperly excessive (too often) operation of the operational device can be prevented.

According to another embodiment of the present invention, the driving-state detecting device is configured to detect a turning radius of a traveling of the vehicle, and the turning state of the vehicle is detected by the driving-state detecting device when the turning radius of the traveling of the vehicle reduces less than a specified turning radius.

Thereby, when the turning state of the vehicle, where the risk of contact of the vehicle with the obstacle is reduced, is detected by detecting the turning radius reducing less than the specified turning radius, the improperly excessive (too often) operation of the operational device can be prevented.

According to another embodiment of the present invention, the driving-state detecting device is configured such that a detecting object of the driving-state detecting device is changeable according to a vehicle traveling speed and/or a road state on which the vehicle travels.

Thereby, for example, the proper detecting object can be selected according to the vehicle traveling speed, by detecting the absolute value of the steering angle exceeding the specified steering angle during the low-speed vehicle traveling and by detecting the absolute value of the lateral acceleration exceeding the specified lateral acceleration during the high-speed vehicle traveling.

According to another embodiment of the present invention, the obstacle detecting device is a millimeter-wave radar.

Since the millimeter-wave radar detects directly a relative speed between the traveling vehicle and the obstacle with the Doppler effect, the detection of the obstacle can be attained properly even if there exists plural obstacles.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
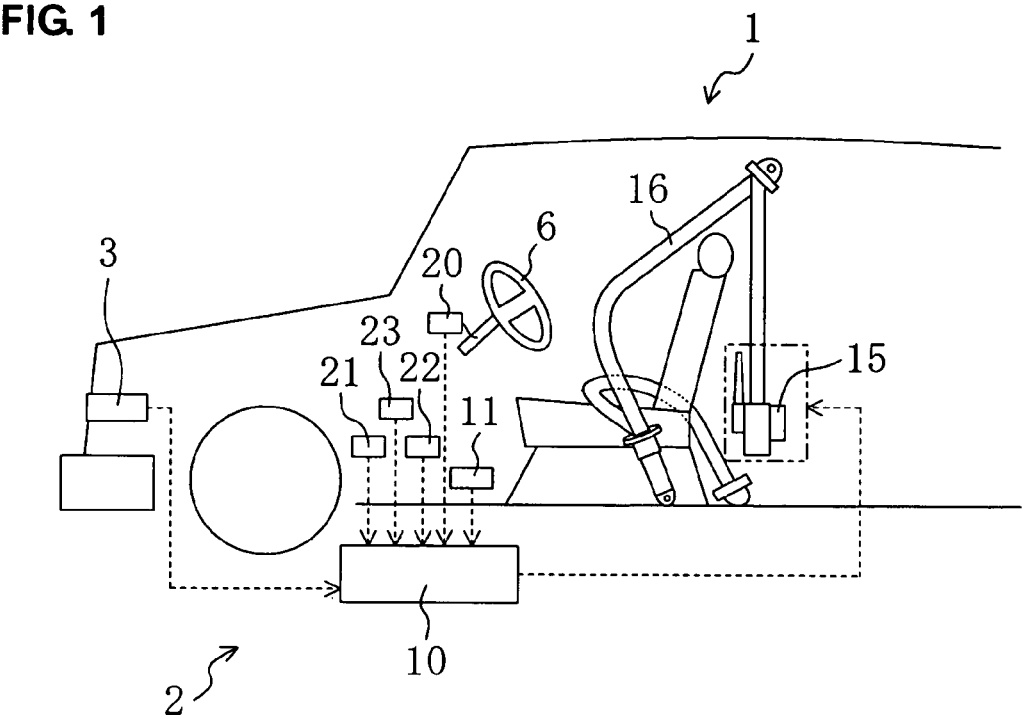
FIG. 1 is a schematic diagram of a vehicle equipped with an obstacle detecting control device according to an embodiment of the present invention.

FIG. 1 shows a vehicle 1 equipped with an obstacle detecting control device 2 according to an embodiment of the present invention. The obstacle detecting control device 2 comprises a millimeter-wave radar 3 as an obstacle detecting device to detect an obstacle in front of the vehicle 1. A millimeter wave has characteristics, such as a superior directivity, a wide covering-area for high-speed communications, and miniaturization or microminiaturization of parts. A detecting area of the millimeter-wave radar 3 expands radiately within a rage of hundred meters or so, as shown by a bold line in FIG. 3. Although the present embodiment shows the millimeter-wave radar 3 with a rightward-offset disposition relative to the center of the vehicle in the vehicle width direction, the radar 3 may be configured not to be offset like this. Also, any other types of radar such as an infrared-rays radar may be applied.

Figure 2:
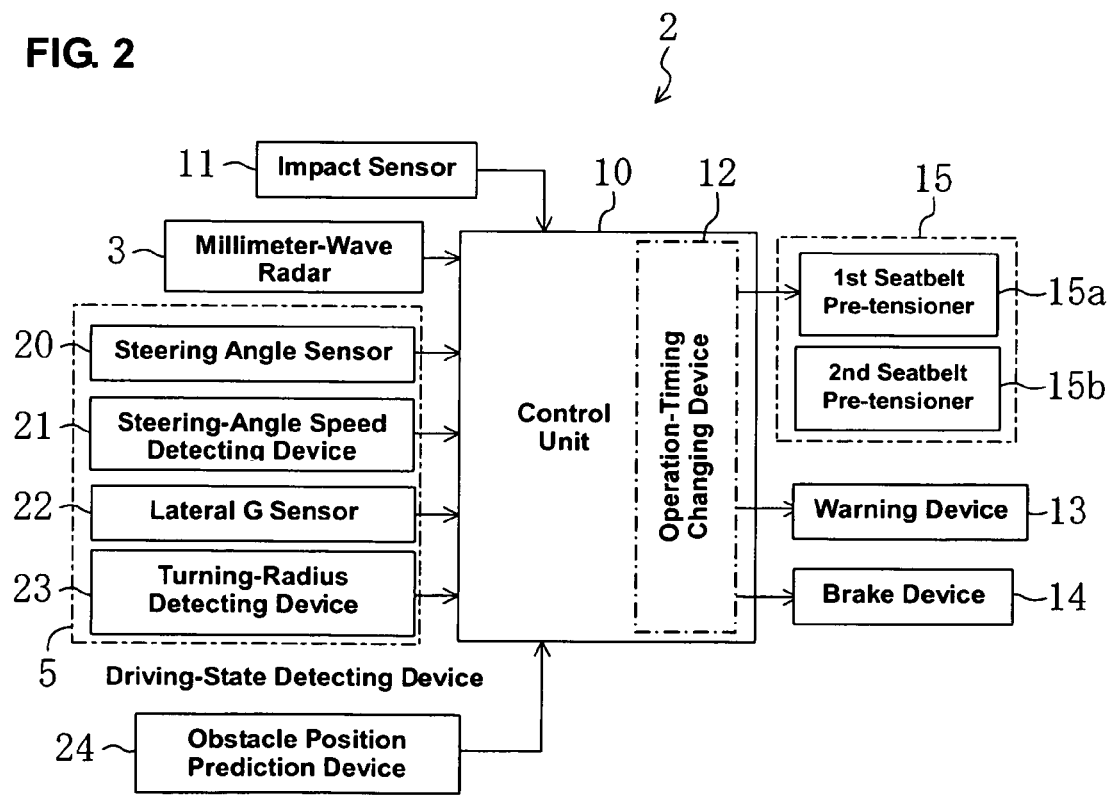
FIG. 2 is a block diagram showing the obstacle detecting control device of a vehicle.

The obstacle detecting control device 2 comprises a driving-state detecting device 5 to detect a specified driving state of the vehicle 1 that is conducted by a passenger as shown in FIG. 2. According to the present embodiment, the specified driving state is a turning state of the vehicle 1, specifically a vehicle traveling state where a steering wheel 6 is operated to make a vehicle turn at a curved corner or to make a vehicle traveling lane change.

The obstacle detecting control device 2 comprises a control unit 10 as an operation control device (described below) to control operational devices of the vehicle 1 according to an obstacle state detected by the millimeter-wave radar 3. The control unit 10 controls the operational devices based on sensor detecting outputs of the driving-state detecting device 5, an impact sensor 11, or the like.

The obstacle detecting control device 2 comprises an operation-timing changing device 12 to change an operation timing of the operational devices according to detection results of the driving-state detecting device 5.

The operational device of the present embodiment comprises a warning device to warn the passenger of a dangerous state, for example, a warning device 13 such as a horn. Any other types of warning device, such as a warning lamp on an instrument panel, a warning indication of a car navigation system, may be also applicable.

Figure 3:
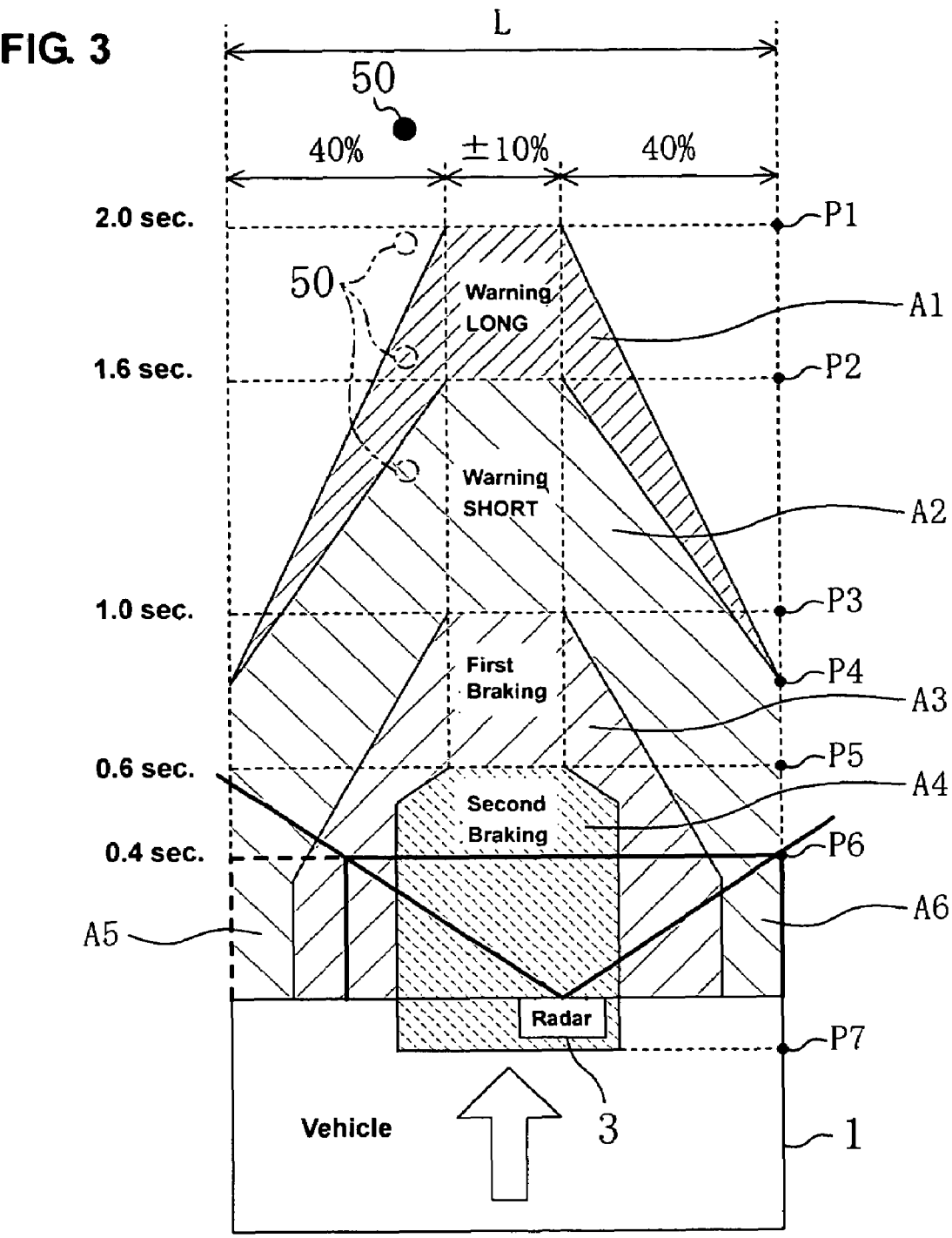
FIG. 3 is a schematic diagram showing a detecting area of a millimeter-wave radar.

As shown in FIG. 3, the warning device 13 is configured to operate in a LONG warning area A1 as a first operation timing and a SHORT warning area A2 as a second operation timing that is delayed by a specified time from the first operation timing. The operation-timing changing device 12 is configured to change the warning area from the LONG warning area A1 to the SHORT warning area A2. Herein, the LONG warning area A1 has a relatively wide detecting area of detecting an obstacle 50 by the millimeter-wave radar 3, while the SHORT warning area A2 has a relatively narrow detecting area of that.

An area of these LONG warning area A1 and the SHORT warning area A2 in a vehicle width direction is limited to about the width L of the vehicle. A front portion of the area is configured to be a mountain-shaped area having a top end area with the width of ±10% of the vehicle width L from the center line. Namely, the LONG warning area A1 is formed by cutting off an outside triangle area that is outside a line interconnecting a point of 40% offset from a side end of the vehicle and 2 seconds prior to crash (P1), and a point of 0% offset and 0.8 seconds prior crash (P4). And, the SHORT warning area A2 is formed by cutting off an outside triangle area that is outside a line interconnecting a point of 40% offset from the side end of the vehicle and 1.6 seconds prior to crash (P2), and the point of 0% offset and 0.8 seconds prior to crash (P4). The reason for the warning area A1, A2 having the outside triangle area cut off is that an operation of the steering wheel 6 can avoid relatively easily the crash (hitting) with the obstacle 50 that are located in this cut-off area, which is relatively far away from the center of the vehicle, compared to the obstacle 50 that are located near the center of the vehicle.

The obstacle detecting control device 2 comprises an operation timing changing switch SW (not illustrated). There may be a situation where the driver does not want a sensitive (very often) operation of the warning device 13. In this situation, operation of this switch SW for SHORT selection can always provide the SHORT warning area A2 regardless of the control by the above operation-timing changing device 12.

The vehicle 1 also includes, as the operation device, a brake device 14 that applies a braking force to the vehicle and a seatbelt pre-tensioner 15 that increases a restraint force of the passenger by reducing loosening of a seatbelt 16. The present embodiment, however, discloses a case where the operation timing of the brake device 14 and the seatbelt pre-tensioner 15 is not changed by the operation-timing changing device 12.

Specifically, when the millimeter-wave radar 3 has determined that the obstacle has approached in an area of a specified distance (the point P3 with 1.0 second prior to crash), the control unit 10 feeds to the brake device 14 a control signal for a first braking that applies a relatively weak braking force to caution the driver. Then, when the millimeter-wave radar 3 has determined that the obstacle has approached in an area of a nearer distance (the point P5 with 0.6 second prior to crash), the control unit 10 feeds to the brake device 14 a control signal for a second braking that applies a relatively strong braking force to avoid the crash. Respective detecting areas A3, A4 for the first and second braking also have an outside cut-off area like the above areas A1, A2. Specifically, the first-braking detecting area A3 is formed by cutting off an outside triangle area that is outside a line interconnecting a point of 10% offset and a specified avoidance-steering time (not illustrated), and a point of 40% offset and 1.0 second prior to crash (P3). And, the second-braking detecting area A4 is formed by cutting off an outside triangle area that is outside a line interconnecting a point of 10% offset and a specified avoidance-steering time (not illustrated), and the point of 40% offset and 0.6 seconds prior to crash (P5). The second-braking detecting area A4 includes an area until 0.2 seconds prior to crash, which is set for absorption of any detection errors to maintain a proper braking operation of the brake device 14 even after the crash.

The operation timing of the first-braking may be changed, like the above waning device 13, between the LONG (wide area) and the SHORT (narrow area) by the operation-timing changing device 12, which is not illustrated. Thereby, an improperly excessive braking operation can be prevented in a case where the risk of the vehicle 1 hitting against the obstacle 50 is low.

The seatbelt pre-tensioner 15, which comprises a first seatbelt pre-tensioner 15a and a second pre-tensioner 15b, operates when the millimeter-wave radar 3 has determined that the obstacle 50 has approached in an area of a specified distance (the point P6 with 0.4 seconds prior to crash) so that the first pre-tensioner 15a can withdraw the seatbelt 16 into a retractor (not illustrated) and thereby the passenger can be restrained with a specified tension (a proper tension not to disturb a crash-avoidance steering operation). The second pre-tensioner 15b can further withdraw the seatbelt 16 to generate a greater restraint force when the vehicle crash has been detected by the impact sensor 11. Herein, the first pre-tensioner 15a comprises an electric motor (not illustrated) to withdraw the seatbelt 16, while the second pre-tensioner 15b comprises an inflator (not illustrated) using explosives to withdraw the seatbelt 16.

Herein, the operation timing of the seatbelt pre-tensioner 15 may be changed by the operation-timing changing device 12 in such a manner that the seatbelt 16 is withdrawn weakly in the wide detecting area LONG (for example, in the first-braking detecting area A3 in FIG. 3) and the seatbelt 16 is withdrawn strongly in the narrow detecting area SHORT (for example, in the second-braking detecting area A4 in FIG. 3). Thereby, an improperly excessive seatbelt withdrawal can be prevented in a case where the risk of the vehicle 1 hitting against the obstacle 50 is low.

In the present embodiment, there are provided, as the driving-state detecting device 5, a steering angle sensor 20 to detect the steering angle θf the steering wheel 6, a steering-angle speed detecting device 21 to detect a steering-angle speed dθf/dt of a changing speed of the steering angle θf, a lateral acceleration (G) sensor 22 to detect a lateral acceleration that is applied to the vehicle 1 in a lateral direction relative to a vehicle traveling direction, and a steering-angle integrated-value detecting device (the control unit 10 in the present embodiment) to detect an integrated value of a change of the steering angle θf the steering wheel 6 with a time. Values of the steering angle θf and the lateral acceleration are inputted to the control unit 10 with operation-direction information, for example, with a positive value for the right-direction operation and a negative value for the left-direction operation. There is also provided a turning-radius detecting device 23 to detect a turning radius of the traveling of the vehicle 1 that is less than a specified turning radius. The turning-radius detecting device 23 may be configured to detect the turning radius based on a signal of the GPS. The steering-angle speed detecting device 21 may be constituted by the control unit 10.

Herein, the driving-state detecting device 5 may be configured to detect part of the above detection objects, not all of them. And, the detection objects by the driving-state detecting device 5 may be changed according to the vehicle traveling speed or a road condition, and the operation-timing changing device 12 may be configured to operate when the detection objects meet specified requirements. Specifically, the control unit 10 may properly select the detection objects of the driving-state detecting device 5 and make the operation-timing changing device 12 operate according the traveling speed of the vehicle 1 and the road condition. Thereby, since the appropriate detection objects are selected according to the traveling speed and the road condition, the safe and smooth vehicle driving can be attained without erroneous detection of the obstacle 50.

The obstacle detecting control device 2 comprises an obstacle position prediction device 24 that predicts the position of the obstacle 50 when the obstacle 50 detected by the millimeter-wave radar 3 comes not to be detected for a while. While the obstacle position prediction device 24 is under operation, a PCS (Pre Crash Safety System) control of the obstacle detecting control device 2, which will be described below, is configured not to operate in order to avoid an erroneous operation.

Figure 4:
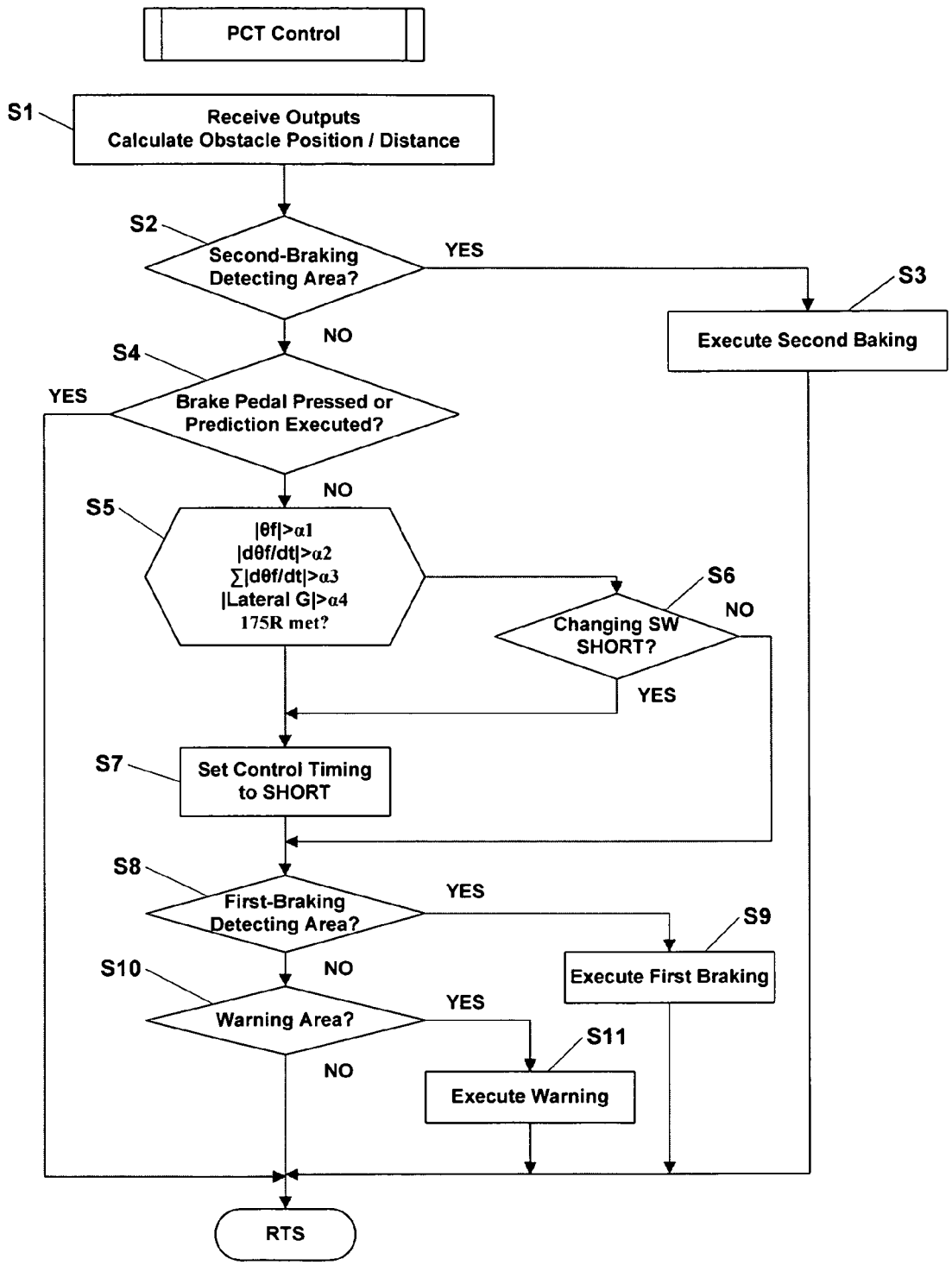
FIG. 4 is a flowchart of a PCS control.

Next, the PCS (Pre Crash Safety System) control conducted by the control unit 10 of the obstacle detecting control device 2 according to the present embodiment will be described referring to FIG. 4.

First, in step S1, the control unit 10 receives outputs of the millimeter-wave radar 3 and calculates to predict the position and distance of the obstacle 50.

Next, in step S2, it is determined whether the obstacle 50 is in the second-braking detecting area A4 or not. When it is in this area A4, the control sequence proceeds to step S3, where the brake device 14 is operated to execute the second braking. After that, the control sequence returns.

When the obstacle 50 is not in the area A4, it is determined in step S4 whether a brake pedal (not illustrated) is pressed or not, or whether the prediction by obstacle position prediction device 24 is executed or not. When the brake pedal is pressed or the prediction by obstacle position prediction device 24 is executed, the control sequence returns here. While, when the brake pedal is not pressed and the prediction is not executed, the control sequence proceeds to step S5.

In the step S5, the following determinations are made by the operation-timing changing device 12: whether the absolute value of the steering angle θf is greater than α1 (e.g., 90 degrees) ($|\theta f| > \alpha 1$); the absolute value of the steering-angle speed dθf/dt is greater than α2 (e.g., 50 degrees/sec) ($|d\theta f/dt| > \alpha 2$), the absolute value of the integrated value of the change of the steering angle θf with the time is greater than α3 (e.g., a predetermined proper value) ($\Sigma |d\theta f/dt| > \alpha 3$), the absolute value of the lateral acceleration is greater than α4 (e.g., 6 m/sec$^2$) ($|lateral\ acceleration| > \alpha 4$), and the turning radius R of the traveling vehicle 1 is smaller than 175 m (R<175). Herein, when all of these determinations are not met (NO), the control sequence proceeds to step S6, and when at least one of these determinations is met (YES), the control sequence proceeds to step S7.

In the step S6, it is determined whether the operation timing changing switch SW is SHORT or not. When it is SHORT, the control sequence proceeds to the step S7. When it is not SHORT, i.e., LONG, the control sequence proceeds to step S8.

In the step S7, the operation timing is set to SHORT. When it is determined that the changing switch SW is SHORT in the step S6, the setting in the step S7 remains its state.

In the step S8, it is determined whether the obstacle 50 is in the first-braking detecting area A3 or not. When it is in the area, the control sequence proceeds to step S9. When it is not, the control sequence proceeds to step S10.

In the step S9, the brake device 14 is operated to execute the first braking such that the relatively weak braking force is applied to the vehicle 1. After that, the control sequence returns.

In the step S10, it is determined whether the obstacle 50 is in the warning areas (A1, A2) or not. When it is in the areas, the control sequence proceeds to step S1. When it is not, the control sequences returns.

In the step S11, the warning device 13 is operated to execute the warning to the driver. After that, the control sequence returns.

According to the obstacle detecting control device 2 of a vehicle of the present embodiment, when the specified vehicle driving state (vehicle turning state) is detected by the driving-state detecting device 5, the operation timing of the operational devices is changed from the first operation timing (LONG warning area A1) to the second operation timing (SHORT warning area A2). Thereby, the operation timing of the operational devices is delayed at the situation where the risk of contact of the vehicle 1 with the obstacle 50 is reduced. Thus the safe and smooth vehicle driving can be attained without the erroneous detection of the obstacle 50.

The operation device of the present embodiment comprises the warning device 13 to warn the passenger of the dangerous state, and the oversensitive alarming is prevented at the situation where the risk of contact of the vehicle 1 with the obstacle 50 is reduced. Thus the safe and smooth vehicle driving can be attained.

In the present embodiment it is determined by the steering angle sensor 20 that the absolute value of the steering angle θf is greater than the specified value. Thereby, since the operation of the steering wheel 6 by the driver is detected promptly by detecting the steering angle θf, the erroneous detection of the obstacle 50 can be prevented effectively, especially at the vehicle low-speed traveling state. Thus the safe and smooth vehicle driving can be attained.

In the present embodiment it is also determined by the steering-angle speed detecting device 21 that the absolute value of the steering-angle speed dθf/dt is greater than the specified value. Thereby, it can be determined that the driver has started the crash-avoidance steering operation by detecting the steering-angle speed dθf/dt being greater than the specified value. Thus the safe and smooth vehicle driving can be attained without the erroneous detection of the obstacle 50.

In the present embodiment it is also determined by the lateral acceleration sensor 22 that the absolute value of the lateral acceleration is greater than the specified value. Herein, the operation timing of the warning device 13 is changed because of detecting the lateral acceleration even if the vehicle makes a turn on a curved road having a relatively large turning radius at a relatively high speed. Thereby, the erroneous detection of the obstacle 50 can be prevented effectively, especially at the vehicle high-speed traveling state. Thus the safe and smooth vehicle driving can be attained.

In the present embodiment it is also determined by the control unit 10 that the absolute value of the integrated value of the change of the steering angle θf with the time is greater than the specified value. Thereby, even when the vehicle travels on a winding road where the driver repeats the steering operation, the erroneous detection of the obstacle 50 can be prevented effectively. Thus the safe and smooth vehicle driving can be attained.

In the present embodiment it is also determined by the turning-radius detecting device 23 that the turning radius of the traveling vehicle 1 is smaller than the specified value. Thereby, even when the vehicle travels on a crank road or a narrow road, the erroneous detection of the obstacle 50 can be prevented effectively. Thus the safe and smooth vehicle driving can be attained.

The obstacle detecting device 2 of the present embodiment is the millimeter-wave radar 3. Thereby, the detection of the obstacle 50 can be attained properly even if there exists plural obstacles. Thus the safe and smooth vehicle driving can be attained.

The above-described embodiment just shows preferred examples. The present invention should not be limited to these, and any other modifications and improvements may be applied within the scope of a sprit of the present invention.

What is claimed is:

1. An obstacle detecting control device of a vehicle, which includes an obstacle detecting device to detect an obstacle in front of the vehicle and an operation control device to control an operational device of the vehicle according to an obstacle state detected by the obstacle detecting device, the obstacle detecting control device comprising:
   a driving-state detecting device to detect a turning state of the vehicle; and
   an operation-timing changing device to change an operation timing of the operational device that is controlled by the operation control device according to detection results of the driving-state detecting device,
   wherein said operation-timing changing device changes the operation timing of the operational device by changing an obstacle-detecting area of the obstacle detecting device in such a manner that the obstacle-detecting area of the obstacle detecting device is shortened when it is detected by said driving-state detecting device that the vehicle is in the turning state.

2. The obstacle detecting control device of a vehicle of claim 1, wherein the operational device of the vehicle is a warning device to warn a passenger of the vehicle of a dangerous state.

3. The obstacle detecting control device of a vehicle of claim 1, wherein the operational device of the vehicle is a brake device to apply a braking force to the vehicle.

4. The obstacle detecting control device of a vehicle of claim 1, wherein the operational device of the vehicle is a seatbelt pre-tensioner to pull in a seatbelt.

5. The obstacle detecting control device of a vehicle of claim 1, wherein the driving-state detecting device is configured to detect a steering angle of a steering wheel of the vehicle, and the turning state of the vehicle is detected by the driving-state detecting device when an absolute value of the steering angle of the steering wheel of the vehicle exceeds a specified steering angle.

6. The obstacle detecting control device of a vehicle of claim 1, wherein the driving-state detecting device is configured to detect a steering angle speed of a steering wheel of the vehicle, and the turning state of the vehicle is detected by the driving-state detecting device when an absolute value of the steering angle speed of the steering wheel of the vehicle exceeds a specified steering angle speed.

7. The obstacle detecting control device of a vehicle of claim 1, wherein the driving-state detecting device is configured to detect a lateral acceleration that is applied to the vehicle in a substantially lateral direction relative to a vehicle traveling direction, and the turning state of the vehicle is detected by the driving-state detecting device when an absolute value of the lateral acceleration applied to the vehicle exceeds a specified lateral acceleration.

8. The obstacle detecting control device of a vehicle of claim 1, wherein the driving-state detecting device is configured to detect an integrated value of a change of a steering angle of a steering wheel of the vehicle with a time, and the turning state of the vehicle is detected by the driving-state detecting device when an absolute value of the integrated value of the change of the steering angle of the steering wheel of the vehicle with the time exceeds a specified integrated value.

9. The obstacle detecting control device of a vehicle of claim 1, wherein the driving-state detecting device is configured to detect a turning radius of a traveling of the vehicle, and the turning state of the vehicle is detected by the driving-state detecting device when the turning radius of the traveling of the vehicle reduces less than a specified turning radius.

10. The obstacle detecting control device of a vehicle of claim 1, wherein the driving-state detecting device is configured such that a detecting object of the driving-state detecting device is changeable according to a vehicle traveling speed and/or a road state on which the vehicle travels.

11. The obstacle detecting control device of a vehicle of claim 1, wherein the obstacle detecting device is a millimeter-wave radar.

* * * * *